United States Patent [19]

Miyoshi et al.

[11] Patent Number: 4,487,802
[45] Date of Patent: Dec. 11, 1984

[54] MAGNETIC RECORDING MEDIUM

[75] Inventors: Takahito Miyoshi; Toshimitu Okutu; Masaaki Fujiyama, all of Kanagawa; Sumitaka Tatsuta, Shizuoka; Nobuo Tsuji, Kanagawa, all of Japan

[73] Assignee: Fuji Photo Film Co., Ltd., Kanagawa, Japan

[21] Appl. No.: 459,089

[22] Filed: Jan. 19, 1983

[30] Foreign Application Priority Data

Jan. 19, 1982 [JP] Japan ................................. 57-6427

[51] Int. Cl.$^3$ ............................ G11B 5/62; G11B 5/68
[52] U.S. Cl. ................................. 428/336; 360/134; 360/135; 360/136; 427/128; 427/131; 428/483; 428/521; 428/523; 428/694; 428/900
[58] Field of Search ............... 428/694, 900, 521, 483, 428/523, 336; 427/131, 128, 39, 41, 40; 360/134–136

[56] References Cited

U.S. PATENT DOCUMENTS 4,153,920  5/1979  Shirahata ........................... 427/131

FOREIGN PATENT DOCUMENTS

| 648878 | 9/1962 | Canada | 427/131 |
| 1384411 | 11/1964 | France | 427/131 |
| 836202 | 6/1960 | United Kingdom | 427/131 |

*Primary Examiner*—Ellis P. Robinson
*Attorney, Agent, or Firm*—Sughrue, Mion, Zinn, Macpeak and Seas

[57] ABSTRACT

A magnetic recording medium is disclosed. The medium is comprised of a non-magnetic flexible support having a subbing layer coated thereon with a magnetic layer coated on the subbing layer. The subbing layer is comprised of a copolymer of a diolefin and a vinyl monomer. The subbing layer provides excellent adhesiveness between the support and the magnetic layer and can be produced without the use of organic solvents. Accordingly, the subbing layer can be economically produced without environmental pollution.

5 Claims, No Drawings

MAGNETIC RECORDING MEDIUM

FIELD OF THE INVENTION

This invention relates to a magnetic recording medium which may be in the form of a video recording tape, an audio recording tape, a tape for an electronic computer, a magnetic sheet, and a tape for measurement, and more particularly to a magnetic recording medium having excellent adhesiveness between a magnetic layer and a support and being prepared in the absence of an organic solvent without accompanying environmental pollution.

BACKGROUND OF THE INVENTION

Polyethylene terephthalate has been recently used as a support for a magnetic recording medium. Polyethylene terephthalate has excellent mechanical strength and durability with respect to exposure to organic solvents. These properties are present because the polyethylene terephthalate is stretched and highly crystallized. Magnetic recording media are produced by coating a coating composition comprising a ferromagnetic fine powder dispersed in a binder on a support. Many attempts have been made to firmly adhere the magnetic recording layer (coating composition) to the support.

For example, methods for providing a subbing layer between a magnetic layer and a support are disclosed in U.S. Pat. No. 3,730,767, Japanese Patent Publication No. 10243/74, Japanese Patent Application (OPI) Nos. 46406/74, 46407/74, 32905/75, 32906/75 and 32907/75. These are not satisfactory due to the composition of the subbing layer.

SUMMARY OF THE INVENTION

A primary object of the invention is to provide a magnetic recording medium which has excellent adhesiveness between the non-magnetic support and the magnetic layer.

Another object of this invention is to provide a magnetic recording medium which is prepared without causing any environmental pollution.

The above objects of the invention can be accomplished by a magnetic recording medium which comprises, between a non-magnetic support and a magnetic layer, a subbing layer containing a copolymer of a diolefin monomer and at least one vinyl monomer. In this invention, a subbing layer is prepared by coating an aqueous dispersion (latex) of the above copolymer on a support in a dry thickness of about not higher than 1 μm and then drying it at 100° C. The particle size in the aqueous dispersion of the copolymer is about 0.1 to 0.2 μm.

DETAILED DESCRIPTION OF THE INVENTION

The diolefin monomer which forms a copolymer in this invention is a monomer which has two ethylene bonds in one molecule, and can have an aliphatic unsaturated hydrocarbon or a cyclic hydrocarbon.

Specific examples of the diolefin monomers are a conjugated diene compound such as butadiene, isoprene or chloroprene; and a non-conjugated diene compound such as 1,4-pentadiene, 1,4-hexadiene, 3-vinyl-1,5-hexadiene, 1,5-hexadiene, 3-methyl-1,5-hexadiene, 3,4-dimethyl-1,5-hexadiene, 1,2-divinylcyclobutane, 1,6-heptadiene, 3,5-diethyl-1,5-heptadiene, 4-cyclohexyl-1,6-heptadiene, 3-(4-pentenyl)-1-cyclopentene, 1,7-oxtadiene, 1,8-nonadiene, 1,9-decadiene, 1,9-oxtadecadiene, 1,10-undecadiene, 1,11-dodecadiene, 1,12-tridecadiene, 1,13-tetradecadiene, 1,14-pentadecadiene, 1,15-hexadecadiene, 1,17-octadecadiene or 1,21-docosadiene. Of these diolefin monomers, conjugated diene compounds (e.g., butadiene, isoprene and chloroprene) are preferred and butadiene is more preferred.

Examples of vinyl monomers which make up the copolymer of this invention include (I) styrene, acrylonitrile, methyl methacrylate, vinyl chloride, vinyl acetate and derivatives thereof, (II) acrylic acid, methacrylic acid, itaconic acid, alkyl acrylate, acrylamide, methacrylamide, acrolein, methacrolein, glycidyl acrylate, glycidyl methacrylate, 2-hydroxyethyl acrylate, 2-hydroxyethyl methacrylate, allyl acrylate, allyl methacrylate, N-methylol acrylamide, N-methylol methacrylamide, vinyl isocyanate and allyl isocyanate. Examples of useful styrene derivatives include methylstyrene, dimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluolomethylstyrene, 4-fluoro-3-trifluoromethylstyrene, vinylbenzoic acid and methyl vinylbenzoate. Of these vinyl monomers, styrene, methyl methacrylate and acrylonitrile are preferably used in this invention.

The copolymer of this invention is composed of a diolefin monomer and a vinyl monomer, and preferably is composed of the diolefin monomer and the vinyl monomer (I), or of the diolefin monomer, the vinyl monomer (I) and the vinyl monomer (II).

Particularly preferred copolymers are styrenebutadiene copolymer, styrene-isoprene copolymer, styrene-chloroprene copolymer, methyl methacrylate-butadiene copolymer and acrylonitrile-butadiene copolymer.

The diolefin monomer content in the copolymer of this invention is 10 to 60 wt% of the copolymer and preferably is 15 to 40 wt%.

The content of the vinyl monomer is 90 to 40 wt % based on the copolymer and preferably the amount of the vinyl monomer (I), particularly styrenes is 70 to 40 wt% based on the copolymer.

The copolymers used in this invention preferably have a glass transition temperature of 90° C. or less and more preferably 70° C. or less. The copolymers may be used individually or as an admixture. Since it is preferred that the subbing layer be in a rubber-like state at a temperature where a magnetic recording medium is generally used, as described below, the copolymers having a relatively high glass transition temperature are generally used in combination with those having a low glass transition temperature.

The subbing layer (after drying) of this invention has a glass transition temperature lower than room temperature (about 25° C.) and is softer than the magnetic recording layer and the non-magnetic support. Therefore, the stress concentration caused between the magnetic layer and the non-magnetic support can be spread and neutralized by the subbing layer. Accordingly, the adhesiveness between the magnetic layer and the non-magnetic support are improved.

Generally, the thicker the subbing layer, the greater the adhesiveness between the magnetic layer and the support. However, other characteristics such as the S/N ratio, which is an electromagnetic property, decrease due to degrade surface smoothness of the subbing layer. However, the subbing layer of this invention can sufficiently retain the adhesive property between the non-magnetic support and the magnetic layer without lowering the S/N ratio, even when the thickness is as low as 0.5 μm or less.

Generally, if a binder having a high glass transition temperature (Tg) is incorporated in a magnetic layer, the adhesive property of the subbing layer which is usually used between the support and the magnetic layer is decreased. On the other hand, in this invention even though a binder having a high glass transition temperature is incorporated in a magnetic layer, the adhesive property of the subbing layer between the support and the magnetic layer is not decreased and could be described as being excellent. That is, the adhesive property of the subbing layer of this invention is not affected by the glass transition temperature of the binder used in the magnetic layer.

The thickness of the subbing layer in this invention is preferably 0.01 to 1.0 μm and more preferably 0.1 to 0.5 μm.

A conventional subbing layer, particularly the layer obtained by dissolving a composition in an organic solvent and coating it, is affected by the solvent used in the magnetic coating composition. More specifically, the solvent decreases the adhesiveness between the subbing layer and coating composition. Further, if the subbing layer is made thicker to increase the adhesive property, it will decrease electromagnetic properties, particularly the S/N ratio. The copolymer of this invention contains 60 wt% or more of a gel fraction and is not readily affected by an organic solvent. Therefore, even a thin subbing layer provides excellent adhesiveness.

In this invention, "gel" means the state where the monomers are three-dimensionally polymerized. When the monomers are three-dimensionally polymerized, the solubility of the polymers with respect to the solvent changes depending on the degree of three-dimensional polymerization. That is, as the three-dimensional polymerization proceeds, the polymers become more difficult to dissolve.

Accordingly, the degree of three-dimensional polymerization of the gel is determined by the solubility of the gel. The solubility varies depending upon the solvent actually used, and thus the degree of three-dimensional polymerization of the gel varies depending upon the solvent. However, in this invention, the term "gel" indicates such a three-dimensionally polymerized product which is not substantially dissolved after being dipped in tetrahydrofuran at 20° C. for 48 hours.

The term "gel fraction" used in this invention is the value calculated in accordance with the following formula.

$$\text{Gel fraction (\%)} = \frac{W_1 - W_2}{W_1} \times 100$$

$W_1$: Weight of the copolymer in the sample.

$W_2$: Solid content in the filtrate obtained by drying the sample at 20° C. in a vacuum, dipping in refined tetrahydrofuran at 20° C. for 48 hours and filtrating. That is, $W_2$ is the weight of the components dissolved out into tetrahydrofuran.

A non-magnetic support of this invention includes an aromatic polyamide film, a polycarbonate film and various polyester films, and preferably a polyethylene terephthalate film. To uniformly coat a subbing layer on a polyester film, the film can be subjected to corona discharge treatment or glow discharge treatment so that the contact angle of the polyester film surface is about 60° with respect to water.

A magnetic layer containing a magnetic powder dispersed in a binder is then coated on the subbing layer and dried. The magnetic powders, binders, additives and methods for preparing the magnetic medium are disclosed in U.S. Pat. No. 4,135,016 herein incorporated by reference.

A magnetic recording medium having the above-mentioned properties can be obtained in accordance with this invention. That is, the thicker the subbing layer is, the better the adhesiveness between the magnetic layer and the support. However, as the surface smoothness degrades, S/N characteristics are decreased in accordance with a conventional method. In this invention, the above defect can be eliminated. When a subbing layer of this invention is employed, a stripping strength of 150 g/½ inch or more is obtained regardless of whether any hard magnetic layer is coated on a support. It should also be noted that the S/N ratio is high in a high density recording having a wave length of 1.3 μm.

This invention is further explained with the following examples. However, the invention is not limited to these examples.

EXAMPLE

Subbing layers having the various compositions as shown in Table 1 were each coated on a biaxially stretched polyethylene terephthalate film having a thickness of 14 μm which was subjected to corona discharge treatment to make the film surface have a contact angle of 45° with respect to water. The coated films were dried. A magnetic layer having a thickness of 5 μm, containing various binders and having a predetermined glass transition temperature was then coated on the subbing layers and dried to prepare samples.

COMPARATIVE EXAMPLE

Subbing layers having various compositions as shown in Table 2 and a magnetic layer were each coated on a biaxially stretched polyethylene terephthalate film having a thickness of 14 μm in the same manner as in Example.

The adhesive strength and initial S/N ratio were measured regarding each of the above magnetic recording tapes in the following manners, and the results are shown in Tables 1 and 2.

Adhesive Strength: Adhesiveness strength was checked by stripping away an adhesive tape adhered to the magnetic layer.

Initial S/N Ratio: Initial S/N ratio is a VHS video cassette deck was checked.

TABLE 1

(Example)

| Sample No. | Compositions for Subbing Layer[1] | Thickness of Subbing Layer (μm) | Tg of Binder of Magnetic Layer[2] (°C.) | Adhesive Strength of Magnetic Layer (g/½ inch) | Initial S/N Ratio (dB) |
|---|---|---|---|---|---|
| 1 | A | 0.2 | 72 | 180 | 0 |
| 2 | " | " | 55 | 200 | −0.1 |
| 3 | " | " | 40 | 230 | " |
| 4 | " | 0.5 | 72 | 200 | " |
| 5 | " | " | 55 | 230 | " |
| 6 | " | " | 40 | 280 | −0.2 |
| 7 | B | 0.2 | 72 | 150 | 0 |
| 8 | " | " | 55 | 190 | −0.1 |
| 9 | " | " | 40 | 210 | " |
| 10 | " | 0.5 | 72 | 190 | " |
| 11 | " | " | 55 | 220 | −0.2 |
| 12 | " | " | 40 | 240 | " |
| 13 | C | 0.2 | 72 | 120 | 0 |
| 14 | " | " | 55 | 170 | −0.1 |
| 15 | " | " | 40 | 190 | " |
| 16 | " | 0.5 | 72 | 160 | " |
| 17 | " | " | 55 | 190 | −0.2 |
| 18 | " | " | 40 | 210 | " |
| 19 | D | 0.2 | 72 | 100 | 0 |
| 20 | " | " | 55 | 150 | −0.1 |
| 21 | " | " | 40 | 170 | " |
| 22 | " | 0.5 | 72 | 140 | " |
| 23 | " | " | 55 | 170 | −0.2 |
| 24 | " | " | 40 | 190 | " |

TABLE 2

(Comparative Example)

| Sample No. | Compositions for Subbing Layer[1] | Thickness of Subbing Layer (μm) | Tg of Binder of Magnetic Layer[2] (°C.) | Adhesive Strength of Magnetic Layer (g/½ inch) | Initial S/N Ratio (dB) |
|---|---|---|---|---|---|
| C1 | a | 0.2 | 72 | 20 | −0.2 |
| C2 | " | " | 55 | 40 | −0.3 |
| C3 | " | " | 40 | 60 | " |
| C4 | " | 0.5 | 72 | 40 | −1.8 |
| C5 | " | " | 55 | 60 | −2.0 |
| C6 | " | " | 40 | 80 | −2.3 |
| C7 | b | 0.2 | 72 | 40 | −0.2 |
| C8 | " | " | 55 | 60 | −0.3 |
| C9 | " | " | 40 | 80 | " |
| C10 | " | 0.5 | 72 | 60 | −1.8 |
| C11 | " | " | 55 | 80 | −2.0 |
| C12 | " | " | 40 | 100 | −2.4 |
| C13 | c | 0.2 | 72 | 15 | −0.2 |
| C14 | " | " | 55 | 30 | −0.3 |
| C15 | " | " | 40 | 50 | " |
| C16 | " | 0.5 | 72 | 30 | −1.8 |
| C17 | " | " | 55 | 50 | −2.0 |
| C18 | " | " | 40 | 70 | −2.5 |
| C19 | d | 0.2 | 72 | 25 | −0.2 |
| C20 | " | " | 55 | 45 | −0.3 |
| C21 | " | " | 40 | 65 | −0.3 |
| C22 | " | 0.5 | 72 | 45 | −1.8 |
| C23 | " | " | 55 | 65 | −2.0 |
| C24 | " | " | 40 | 85 | −2.3 |
| C25 | e | 0.2 | 72 | 25 | −0.2 |
| C26 | " | " | 55 | 45 | −0.3 |
| C27 | " | " | 40 | 65 | " |
| C28 | " | 0.5 | 72 | 45 | −1.8 |
| C29 | " | " | 55 | 65 | −2.0 |
| C30 | " | " | 40 | 85 | −2.3 |
| C31 | no subbing layer | — | 72 | 0 | 0 |
| C32 | " | — | 55 | 5 | −0.1 |

TABLE 2-continued

| | | | (Comparative Example) | | |
|---|---|---|---|---|---|
| Sample No. | Compositions for Subbing Layer[1] | Thickness of Subbing Layer (μm) | Tg of Binder of Magnetic Layer[2] (°C.) | Adhesive Strength of Magnetic Layer (g/½ inch) | Initial S/N Ratio (dB) |
| C33 | " | — | 40 | 5 | " |

[1]Compositions for Subbing Layer:
Example
A: An aqueous dispersion of styrene-butadiene copolymer (weight ratio of styrene/butadiene: 60/40, and gel fraction: 95 wt %)
B: An aqueous dispersion of styrene-butadiene copolymer (weight ratio of styrene/butadiene: 70/30, and gel fraction: 60 wt %)
C: An aqueous dispersion of α-methylstyrene-butadiene copolymer (weight ratio of α-methylstyrene/butadiene: 60/40, and gel fraction: 80 wt %)
D: An aqueous dispersion of styrene-butadiene-2-ethylhexyl acrylate copolymer (weight ratio of styrene/butadiene/2-ethylhexyl acrylate: 33/54/13, and gel fraction: 64 wt %)
Comparative Example
a: A 10 wt % solution of vinylidene chloride-vinyl chloride copolymer in methyl ethyl ketone (weight ratio of vinylidene chloride/vinyl chloride: 90/10 and molecular weight: about 20,000)
b: A 10 wt % solution of saturated polyester in methyl ethyl ketone (molecular weight of the polyester: 15,000–20,000)
c: A 10 wt % solution of polyurethane resin in methyl ethyl ketone (molecular weight of the polyurethane: 60,000–70,000)
d: A 10 wt % solution of vinylidene chloride-acrylonitrile copolymer in methyl ethyl ketone (weight ratio of vinylidene chloride/acrylonitrile: 80/20)
e: An aqueous dispersion of vinylidene chloride-ethyl acrylate copolymer (weight ratio of vinylidene chloride/ethyl acrylate: 90/10)
[2]Tg of Binder in Magnetic layer
Tan δ peak measured by viscoelasticity device.

As is clear from Tables 1 and 2, a subbing layer prepared by coating an aqueous dispersion of a copolymer of a diolefin monomer and at least one vinyl monomer provides excellent adhesiveness between a magnetic layer and a support and also provides a tape having excellent initial S/N ratio.

The subbing layer of this invention is prepared in the absence of an organic solvent, which is used in the comparative examples. Therefore, this invention is economically advantageous from the viewpoint of environmental pollution.

This invention can be utilized for any magnetic recording media such as video sheets, discs, etc., as well as various magnetic recording tapes.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising:
   a non-magnetic flexible support;
   a subbing layer having a thickness of from 0.01 to 1.0 μm coated on a surface of the support, wherein the subbing layer consists essentially of a copolymer of 10 to 60 wt% of a diolefin and 90 to 40 wt% of a styrene based on the weight of the copolymer and has a gel fraction of 60 wt% or more and a glass transition temperature of 90° C. or less; and
   a magnetic layer coated on the subbing layer.

2. A magnetic recording medium as claimed in claim 1, wherein the diolefin is selected from the group consisting of butadiene, isoprene and chloroprene.

3. A magnetic recording medium as claimed in claim 1, wherein the diolefin is present in the copolymer in an amount of 15 to 40 wt% based on the weight of the copolymer.

4. A magnetic recording medium as claimed in claim 1, wherein the styrene is present within the copolymer in an amount of 70 to 40 wt% based on the weight of the copolymer.

5. A magnetic recording medium as claimed in claim 1, wherein the subbing layer has a thickness of from 0.1 to 0.5 μm.

* * * * *